J. P. STANZA.
CULTIVATOR SHOVEL.
APPLICATION FILED OCT. 14, 1911.
1,037,355.
Patented Sept. 3, 1912.
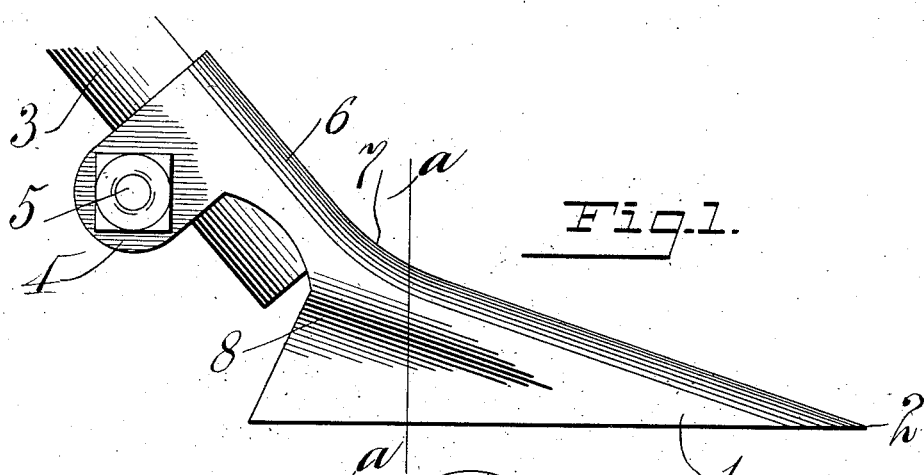
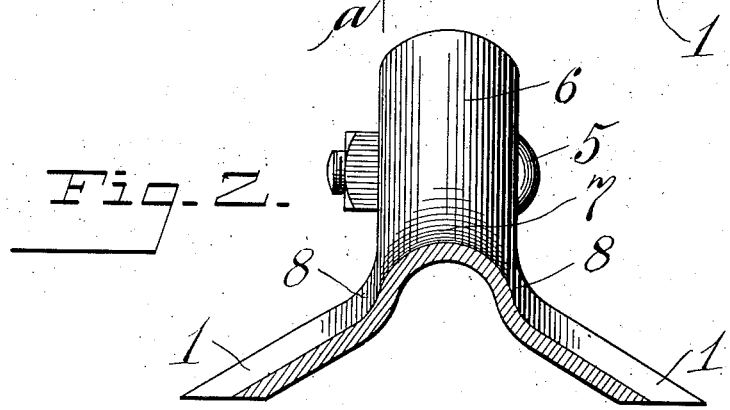
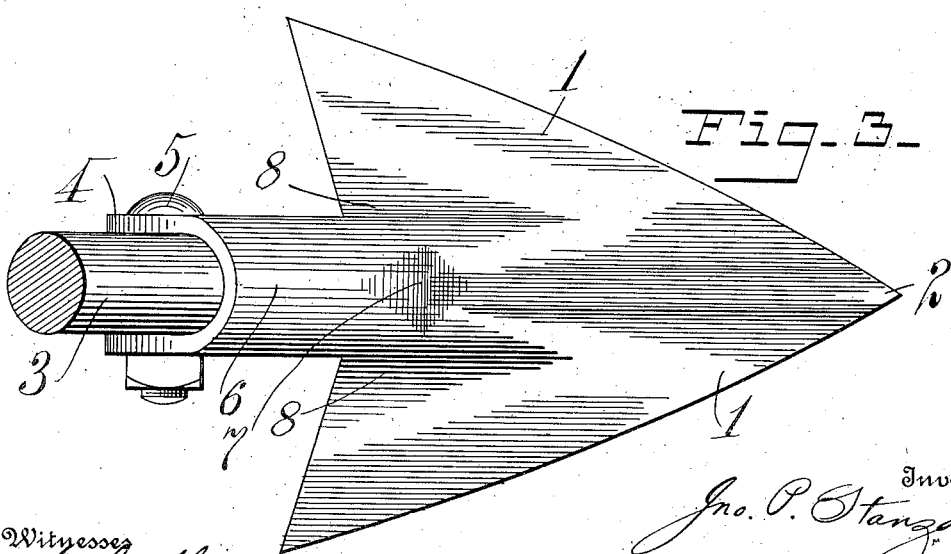

UNITED STATES PATENT OFFICE.

JOHN P. STANZA, OF EATON, OHIO.

CULTIVATOR-SHOVEL.

1,037,355.  Specification of Letters Patent.  Patented Sept. 3, 1912.

Application filed October 14, 1911. Serial No. 654,583.

*To all whom it may concern:*

Be it known that I, JOHN P. STANZA, a citizen of the United States, residing at Eaton, in the county of Preble and State of Ohio, have invented certain new and useful Improvements in Cultivator-Shovels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to cultivator shovels for corn plows, and comprises certain essential improvements of the cultivator shovel shown and described in former Letters Patent granted to myself, November 22, 1910, No. 976,518.

The object of the present invention is to provide a cultivator shovel that will so act upon the ground to open it and admit air thereto, and will cause the open ground to lie substantially level as the shovel passes through, thus filling the hollow formed by the shank. This is very essential for growing crops as the ground is not thrown out and allowed to dry out.

A further object of the invention is to provide a shovel so formed as to meet with the least resistance in passing through the ground and from the upper surface of which the earth will shed, owing to the particular configuration of the shovel.

A further object of the invention is to provide a shovel which is as easily attachable to the standard as possible. The shovel is made in one piece of steel so shaped as to form an easy and gradual curve or bend at the point where the shank extends from the shovel. At this point and on each side, the blade extends in gradual curves so that the upper surface of the shovel presents an unobstructed surface of suitable incline to cause the soil to pass therefrom as the shovel advances. On each side of the longitudinal axis of the shovel, and near the shank, is formed a depression. These depressions in connection with the rearward points of the shovel which lie behind said depressions cause the ground to turn over and to fill the hollow formed by the shank. The ground is loosened and is exposed to the air and as the shovel advances, the loosened ground falls back into the hollow and presents a substantial level surface, a feature in the cultivation of the soil which is highly desirable.

Referring to the accompanying drawings, Figure 1 is a side elevation of my improved cultivator shovel; Fig. 2 is a section on the line *a—a* of Fig. 1; Fig. 3 is a top plan view of the shovel.

As stated, the shovel is formed of a single sheet of metal and as compared with the shovel of my former patent, there is no obstructing part at the rearward end or elsewhere. The blade 1 from the front or pilot end 2 extends rearwardly, gradually increasing the width of the blade. In practice I prefer the width of the shovel and the axial length thereof to be approximately equal so that the junction between the shank and the blade shall lie forward of the rearward corners of the blade. These cutting edges of the blade are so formed as to enter the ground and to readily cut any weeds that may lie in the paths of said cutting edges. In the initial movement of the shovel the edges referred to do not lie flat upon the surface of the ground, but enter the ground on a slight angle thereto and the said edges lie in such positions as to readily cut the weeds that might lie in the way. Extending from the rear end of the shovel and integral therewith is the cultivator standard 6, which is curved in cross section and terminates in a socket with apertured clamping ears 4 extending therefrom. Within this socket the shank 3 is extended and is securely held in position connecting the shovel, by means of a draw bolt 5, one end of which is provided with a head, and the other end of which is provided with a nut.

It will be seen that at the junction between the shank 6 and the blade, the latter inclines outwardly to the rear corners of the blade. This is an important structural feature as it is at these points the soil falls back into the opening made by the shank as the shovel moves forward.

It will be understood that there are gangs of the shovels in a plow, and in describing the construction and peculiarities of one, the other shovels are likewise described.

It will be observed that the cultivator standard 6 is united to the rear or upward end of the shovel by a gradual curve 7, which is only slightly above the plane of the incline of the longitudinal axis of the shovel.

This is a very desirable manner of forming the shank and the shovel; it is very strong at the point of the union between the two and is thus capable of standing the utmost strain. The shovel adjacent to the point where the standard 6 joins it has a particular formation, which is essential and to which particular attention is called. This formation consists of depressions 8 which lie immediately at the point where the blade extends from the juncture between the shank and the rear end of the shovel. The rearward points of the blade extend on suitable angles from these depressions 8, and lie in the rear or back of said depressions so that when the shovel passes through the soil, it will be turned over and caused to fall into the hollow created by the shank. In thus loosening the soil and causing it to fall back of the shovel, the air is freely admitted thereto, and the ground is left in a substantially level condition for cultivation.

It will be readily seen that with shovels thus formed, with no obstructing parts, the dirt will be constantly pushed off as the plow advances in the earth, and the annoyance of having to clean the shovels of the cultivator at short intervals during the work of plowing, is avoided.

Having described my invention, I claim:—

A cultivator shovel or blade formed from a substantially triangular blank of sheet metal, the transverse rearward portion of the blade and the axial length thereof being approximately equal, the said blade being bent on its longitudinal axis and tapered therefrom on each side and terminating in a hollow shank for the attachment of the cultivator standard, the rearward portion of the blade being concaved on each side of the longitudinal axis adjacent to the shank, and the rear corners of the blade lying rearwardly of the junction between the blade and the shank and joining the axis of the blade by inclined edges, whereby the soil divided by the shank is caused to fall back into the cut, substantially as described.

In testimony whereof I affix my signature, in presence of two witnesses.

JOHN P. STANZA.

Witnesses:
R. J. McCarty,
Matthew Siebler.